United States Patent
Popowski

(10) Patent No.: US 9,830,550 B2
(45) Date of Patent: Nov. 28, 2017

(54) SYSTEM INCORPORATING ACTIVELY AUTHENTICATED MULTIFACTOR PROXIMITY CARD

(71) Applicant: Honeywell International Inc., Morristown, NJ (US)

(72) Inventor: Paul M. Popowski, Lake Mills, WI (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 314 days.

(21) Appl. No.: 14/044,230

(22) Filed: Oct. 2, 2013

(65) Prior Publication Data

US 2015/0090785 A1    Apr. 2, 2015

(51) Int. Cl.
*G06K 5/00* (2006.01)
*G06K 19/077* (2006.01)
*G06K 19/073* (2006.01)
*G06K 19/10* (2006.01)

(52) U.S. Cl.
CPC . *G06K 19/07709* (2013.01); *G06K 19/07309* (2013.01); *G06K 19/10* (2013.01)

(58) Field of Classification Search
USPC ........................................ 235/380, 382, 492
See application file for complete search history.

(56) References Cited

U.S. PATENT DOCUMENTS

| | | | |
|---|---|---|---|
| 8,474,710 B2 | 7/2013 | Marcinowski et al. | |
| 2007/0075138 A1* | 4/2007 | Ross | G06K 9/00885 235/435 |
| 2008/0028230 A1* | 1/2008 | Shatford | H04L 9/3231 713/186 |
| 2009/0266885 A1* | 10/2009 | Marcinowski | G07C 9/00023 235/382 |
| 2011/0079646 A1 | 4/2011 | Lin | |

OTHER PUBLICATIONS

Extended European search report for corresponding EP application 14184851.5, dated Mar. 6, 2015.

* cited by examiner

*Primary Examiner* — Rafferty Kelly
(74) *Attorney, Agent, or Firm* — Husch Blackwell LLP

(57) ABSTRACT

A portable card includes a resonance circuit of the portable card that wirelessly receives power from an external source, a processor of the portable card that wirelessly transmits a predetermined data sequence in response to the resonance circuit receiving power from the external source, and a set of at least three contacts on an exterior of the portable card, wherein a user bridges the contacts with the user's fingers in a predetermined combination to create a circuit and activate the processor for transmission of the predetermined data sequence.

21 Claims, 3 Drawing Sheets

SYSTEM INCORPORATING ACTIVELY AUTHENTICATED MULTIFACTOR PROXIMITY CARD

FIELD

The field of the invention relates to proximity cards and, more particularly, to security for proximity cards.

BACKGROUND

Proximity cards are generally known. Such cards typically include a resonant circuit and a processor coupled to the resonant circuit.

A proximity card may be used in conjunction with a card reader that wirelessly transmits a radio frequency signal to the proximity card at a frequency that causes the resonant circuit of the proximity card to resonate. This resonance within the resonant circuit charges a power capacitor of the proximity card.

The capacitor of the proximity card provides power to the processor of the proximity card. Upon receiving power from the capacitor, the processor wirelessly transmits a data signal to the card reader.

While proximity cards work well, they may be compromised with the appropriate equipment. For example, a thief may walk through a crowd with a portable transceiver that transmits a signal at a number of different frequencies. As the portable transceiver enters a resonant range of any nearby proximity cards carried by authorized users, a nearby proximity card may transmit a response. The portable transceiver carried by the thief copies the data of the response transmitted by the nearby proximity card. Once the thief knows the resonant frequency and response, the thief is able to prepare duplicates of the proximity card. Accordingly, a need exists for better methods of protecting the data saved on proximity cards.

DETAILED DESCRIPTION OF AN ILLUSTRATED EMBODIMENT

Figure 1:
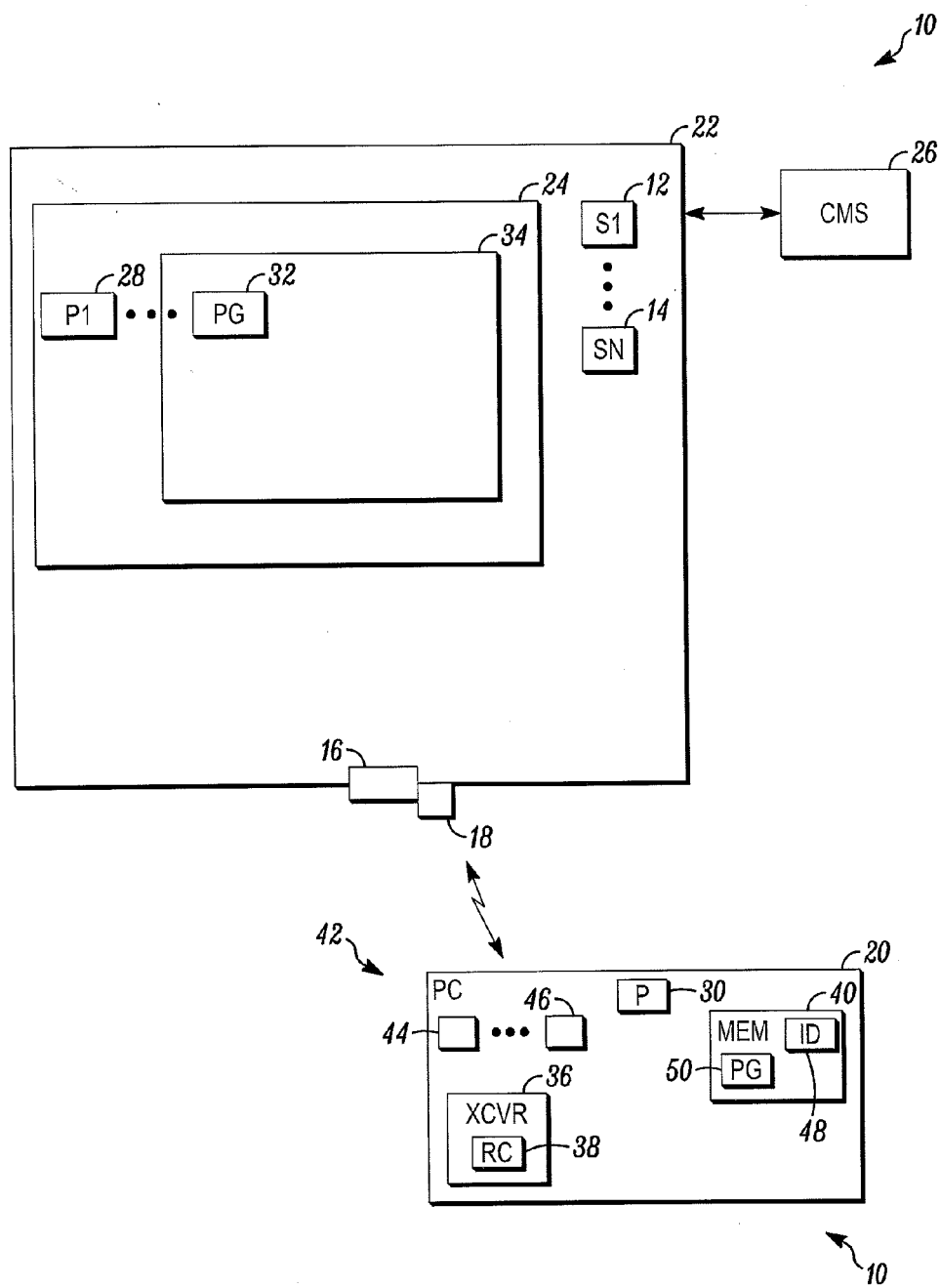
FIG. 1 depicts a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof as well as the best mode of practicing the same. No limitation to the specific embodiment illustrated is intended.

FIG. 1 is a block diagram of a security system 10 shown generally in accordance with an illustrated embodiment. Included within the security system may be a number of sensors 12, 14 used to detect threats within a secured area 22.

Also included within the secured area may be one or more doors 16 that allow access into and egress from the secured area. A card reader 18 may be provided in conjunction with a door that controls an electrically operated lock that secures the door.

One or more proximity cards 20 may be issued to persons who are authorized to be present within the secured area. The proximity cards may operate as one or more of an access card, a credit card, or any other authentication token. Where structured as an access card, the proximity cards may be presented to the card reader. The card reader reads a card and activates the electrically operated lock, thereby opening the door and allowing a card carrier entrance into the secured area.

Under one particular embodiment, the proximity cards discussed herein are constructed with a very simple circuit that operates without a battery and, instead, receives its operating power inductively from a nearby card reader. Because the proximity card relies upon inductively coupled power, it must be able to rapidly activate and perform specific acts before the inductively coupled power associated with swiping a card through a card reader is depleted. Such cards would not have the ability to perform complex computations such as those generally required to encrypt responses.

In another embodiment, the proximity cards could be used as credit cards. For example, a number of card readers may be present within the secured area, and each may be associated with a point of sale (POS) terminal. In this case, the proximity cards may operate as a credit card used in the purchase of a product through the POS terminal.

Located within the secured area may be a local control panel that monitors the sensors. Upon activation of one of the sensors, the control panel may send an alarm message to a central monitoring station 26. The central monitoring station may respond by sending help.

Included within the control panel and proximity card may be control circuitry that achieves the functionality discussed below. The control circuitry may include one or more processor apparatus (processors) 28, 30 that each operate under control of one or more respective computer programs 32, 50 loaded from a non-transitory computer readable medium (memory) 34, 40. As used herein, reference to a step of a computer program is also reference to the processor that executed that step.

During normal operation, an alarm processor of the control panel may monitor a status of each of the sensors. Upon activation of one of the sensors, the alarm processor may compose and send the alarm message to the central monitoring station.

In the case of the card reader detecting a proximity card and unlocking the door, the alarm processor may delay issuing an alarm message. In this case, the delay allows an authorized user to enter an identifier through a user interface of the security system.

Included within each of the proximity card and card reader is a radio frequency transceiver (XCVR) 36. The transceiver of the card reader may be first used to transmit a pulse of energy to the proximity card and then to wait for a response from the proximity card. In this regard, the pulse of energy is transmitted at a frequency that resonates within a resonance circuit 38 of the proximity card. The resonant signal of the pulse is received by an antenna of the resonance circuit and operates to charge a capacitor within the proximity card. The energy saved within the capacitor provides sufficient energy for the processor 30 of the proximity card to transmit data back to the card reader.

Upon activation of the processor of the proximity card, the processor first reads a keypad 42. In this regard, the keypad 42 includes a number of touch pads 44, 46 that may be bridged by the fingers of a user in such a way as to indicate use of the proximity card by the authorized user. Upon detecting activation of the keypad 42 by the authorized user, the processor retrieves a file 48 from a memory 40 that contains a data sequence including an identifier of the authorized user and transmits the identifier to the card reader.

The card reader compares the received data sequence with a copy of the identifier saved within its memory or the memory of the control panel. If a match is found, then the card reader activates the lock on the door, thereby allowing entry of the authorized user into the secured area.

Figure 2:
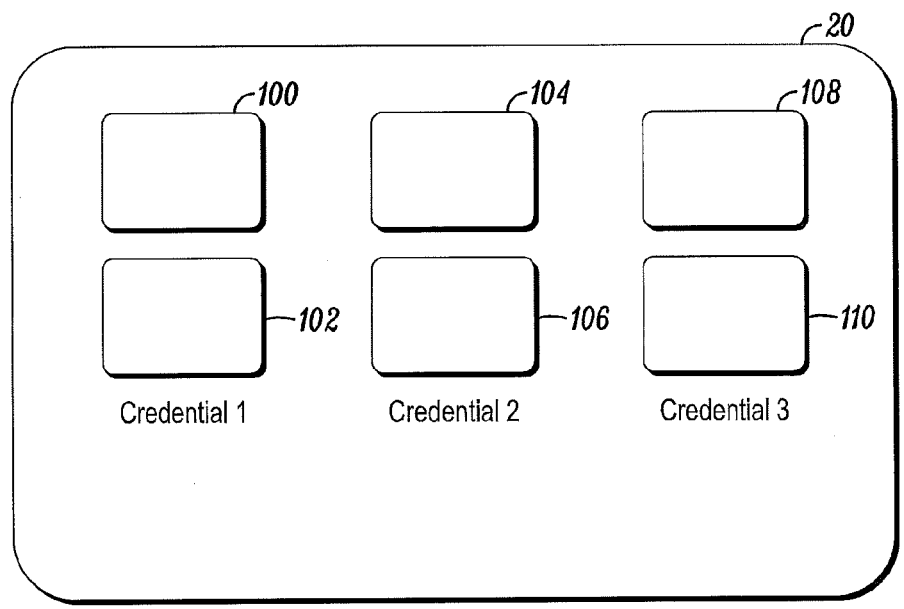
FIG. 2 depicts a keypad of a portable card that may be used with the system of FIG. 1.
Figure 3:
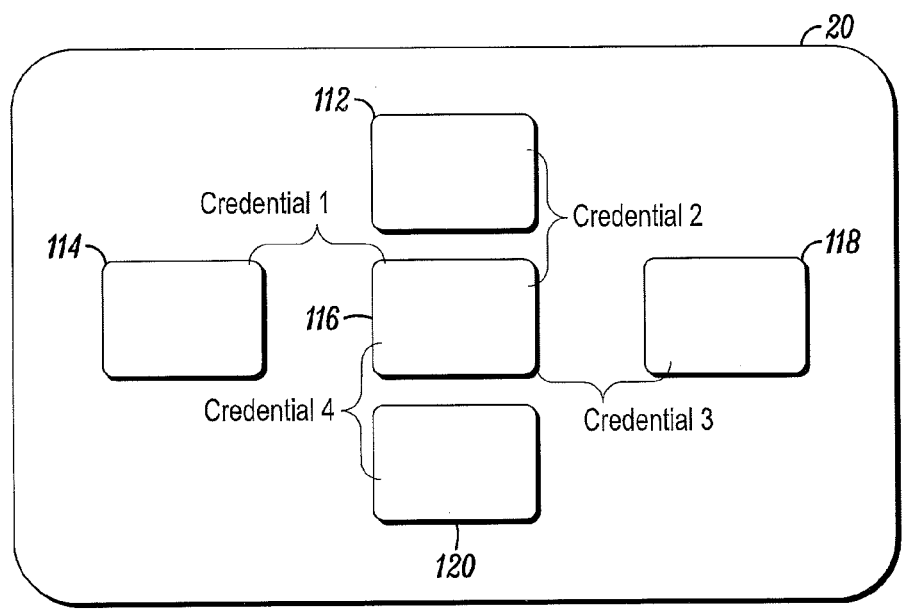
FIG. 3 depicts an alternative portable card and keypad that may be used with the system of FIG. 1.
Figure 4:
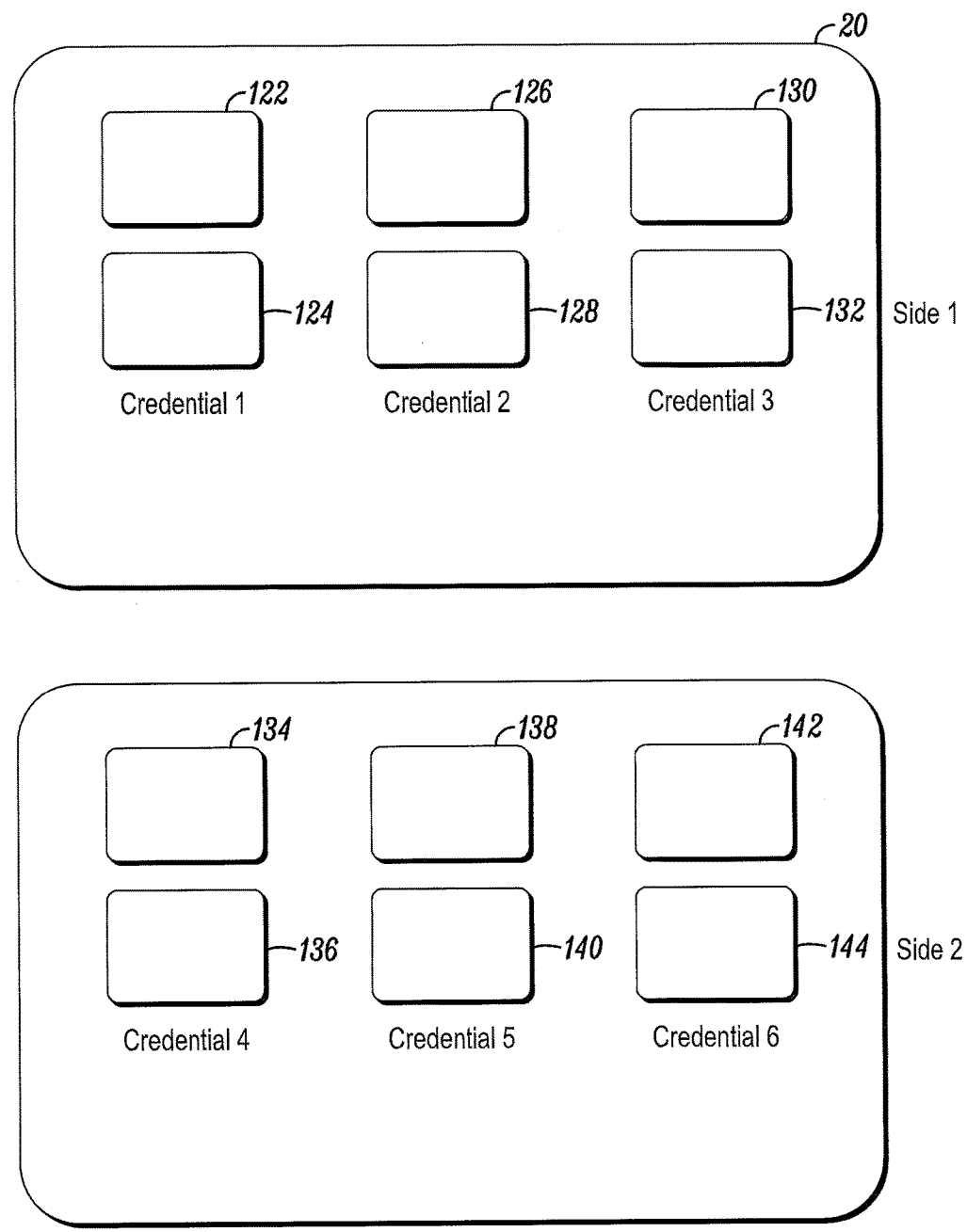
FIG. 4 depicts a keypad that may be used on both sides of a card used with the system of FIG. 1.

FIGS. 2-4 depict various layouts of the keypad 42. FIG. 2 shows a first embodiment of the keypad 42 in which the keypad has six touchpads (labeled 100-110 in FIG. 2) arranged in three sets of two touchpads each. The use of multiple touchpads has a number of advantages. For example, the proximity card cannot be read without activation by the user. Activation, in this case, means that at least two of the touchpads are bridged by the fingers of the user.

Another advantage of multiple touchpads is that different touchpads may be bridged by the user at different times to provide or otherwise enter different control codes that would only be known by the authorized user. For example, FIG. 2 shows that a first set of touchpads 100, 102 may be bridged by the user to transmit a first credential, a second set of touchpads 104, 106 may be bridged by the user to transmit a second credential, and a third set of touchpads 108, 110 may be bridged by the user to transmit a third credential.

Upon activation of the proximity card (via charging of the capacitor), the processor of the proximity card may first measure a resistance between each pair of pads. This is necessary to ensure that the correct set of pads are being activated by the fingers of the user rather than being bridged by or in contact with a conductive object within the wallet or purse of the user.

For example, the touch pads 100, 102 may be the correct pads to be activated in order to transmit the identifier of the authorized user. In this case, the processor may measure the resistance between the pads 100 and 102, between the pads 104 and 106, and between the pads 108 and 110. If the resistance between the pads 100 and 102 is of the correct range, then the processor may transit the identifier of the authorized user. If not, then the processor may not transmit anything or may transmit an incorrect or random value or an error code.

The card reader may receive the data sequence from the proximity card and compare the received data with a saved value. If the data matches, then the card reader may open the door or authorize a purchase through an associated POS terminal. If an incorrect or random value is received, then the card reader may assume that the card is being used by an unauthorized user and lock out any further values from the proximity card.

It should be noted, in this regard, that the resistance values measured by the processor should be consistent with expected values of the skin of the user. This may include values provided if the user activates one contact (e.g., 100) with his/her forefinger and activates the other contact (e.g., 102) with his/her thumb on the same hand or if the user simply bridges the contacts 100, 102 by placing his/her thumb across the two contact pads.

It should also be noted that the processor may first measure the resistance between each of the correct set of contacts (100, 102) and then each of the other four incorrect contacts (104, 106, 108, 110) on the proximity card. If these subsequently measured values are not consistent with an open circuit, then the processor may also transmit an incorrect or random data sequence. This may also be done as a secondary procedure to ensure that the card is being used by the authorized person.

FIG. 3 is another example of a layout of the keypad 42. In this case, the center touchpad 116 may be used in combination with the surrounding touchpads 112, 114, 118 and 120 to verify use by the authorized person.

In another illustrated embodiment shown in FIG. 4, both sides of the proximity card may be used for touch pads of the keypad 42. In the example of FIG. 4, six credentials may be available using any one of the six combinations of touch pads (122 and 124, 126 and 128, 130 and 132, 134 and 136, 138 and 140, or 142 and 144).

In other illustrated embodiments, any combination of touch pads may be used as a basis for transmitting the correct sequence. In the case of the keypad 42 of FIG. 2, this would allow for a significant increase in the number of possible combinations. This would dramatically increase the difficulty for an unauthorized person to guess the correct set of touchpads to activate.

In another embodiment, the different credentials may be used for different purposes. For example, credential 1 could be used as an access credential for unlocking an entrance into the secured area while credentials 2 and 3 could be used to generate and transmit codes to access different credit card accounts or to disarm the security system.

Alternatively one set of pads may be reserved for emergency purposes (e.g., the person has been ambushed and is attempting to enter the secured area under physical threat from another person). In this case, the authorized user may place his/her fingers across a predetermined set of emergency pads that notifies the control panel of the threat. In response, the control panel may silently send an ambush alarm to the central monitoring station.

Under still another embodiment, the proximity card may include a battery that allows the proximity card to operate from greater distances. In this case, the proximity card may detect the security system via the wireless transmissions from the card reader or between components of the security system. In this case, the placement of the user's fingers across a predetermined set of contacts of the proximity card could be used to send an alarm notification to the card reader or directly to the alarm panel.

Under still another embodiment, the different contacts on the proximity card are associated with responses that are transmitted at different frequencies. For example, a response to a card reader for access into the secured area may be transmitted at a first frequency while credit card use may involve use of a different frequency.

In general, the system uses a portable card including a resonance circuit of the portable card that wirelessly receives power from an external source, a processor of the portable card that wirelessly transmits a predetermined data sequence in response to the resonance circuit receiving power from the external source, and a set of at least three contacts on an exterior of the portable card, wherein a user bridges the contacts with the user's fingers in a predetermined combination to create a circuit and activate the processor for transmission of the predetermined data sequence.

Alternatively, the system includes a portable card, a card reader, a resonance circuit of the portable card that wirelessly receives power from the card reader, a processor of the portable card that wirelessly transmits a predetermined data sequence to the card reader in response to the resonance circuit receiving power from the card reader, and a set of at least three contacts on an exterior of the portable card, wherein a user bridges the contacts with the user's fingers in a predetermined combination to create a circuit and activate the processor for transmission of the predetermined data sequence.

As a still further alternative, the portable card includes a resonance circuit of the portable card that wirelessly receives power as a radio frequency pulse from an external power, a processor of the portable card that wirelessly transmits a predetermined data sequence to the card reader in response to the resonance circuit receiving power from the external source, and a plurality of touch pads on the card, the plurality of touch pads forming at least three different contact sets on an exterior of the portable card, wherein a user bridges the touch pads with the user's fingers in a predetermined combination to create a circuit and activate the processor for transmission of the predetermined data sequence.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A portable card comprising:
a resonance circuit of the portable card that wirelessly receives power from an external source;
a processor of the portable card that commands a transceiver to wirelessly transmit a predetermined data sequence in response to the resonance circuit receiving the power from the external source; and
at least first, second, and third contacts on an exterior of the portable card,
wherein a user bridges at least one pair of the first, second, and third contacts with one or more of the user's fingers to create a second circuit and activate the processor for transmission of the predetermined data sequence,
wherein the processor of the portable card measures a first electrical value between the first contact and the second contact, a second electrical value between the second contact and the third contact, and a third electrical value between the first contact and the third contact to determine if one of the first electrical value, the second electrical value, and the third electrical value is within a predetermined range consistent with predetermined electrical values of skin, and
wherein bridging the first contact and the second contact causes the transmission of an authorized data sequence and bridging the second contact and the third contact or bridging the first contact and the third contact causes the transmission of an unauthorized data sequence.

2. The portable card as in claim 1 wherein the external power source further comprises a card reader.

3. The portable card as in claim 2 wherein the card reader further comprises a door lock coupled to the card reader, and wherein the card reader activates the door lock granting access to the user into a secured area.

4. The portable card as in claim 1 wherein each of the first, second, and third contacts includes two touchpads.

5. The portable card as in claim 1 wherein the portable card further comprises six contacts.

6. The portable card as in claim 5 wherein each of the six contacts includes two touchpads, and wherein each of the two touchpads is on an opposing side of the portable card.

7. The portable card as in claim 1 wherein the unauthorized data sequence is an error code.

8. The portable card as in claim 7 further comprising a card reader that locks out the portable card upon receiving the error code.

9. The portable card as in claim 1 wherein the portable card further comprises one of an access card and a credit card.

10. The portable card as in claim 1 wherein the portable card further comprises an access card and a credit card selected by a combination of the first, second, and third contacts activated.

11. A system comprising:
a portable card;
a card reader;
a resonance circuit of the portable card that wirelessly receives power from the card reader;
a processor of the portable card that commands a transceiver to wirelessly transmit a predetermined data sequence to the card reader in response to the resonance circuit receiving the power from the card reader; and
at least first, second, and third contacts on an exterior of the portable card,
wherein a user bridges at least one pair of the first, second, and third contacts with one or more of the user's fingers to create a second circuit and activate the processor for transmission of the predetermined data sequence,
wherein the processor of the portable card measures a first electrical value between the first contact and the second contact, a second electrical value between the second contact and the third contact, and a third electrical value between the first contact and the third contact to determine if one of the first electrical value, the second electrical value, and the third electrical value is within a predetermined range consistent with predetermined electrical values of skin, and
wherein bridging the first contact and the second contact causes the transmission of an authorized data sequence and bridging the second contact and the third contact or bridging the first contact and the third contact causes the transmission of an unauthorized data sequence.

12. The system as in claim 11 wherein the card reader further comprises a point of sale.

13. The system as in claim 11 wherein each of the first, second, and third contacts includes two touchpads.

14. The system as in claim 11 wherein the portable card further comprises six contacts.

15. The system as in claim 14 wherein each of the six contacts includes two touchpads, and wherein each of the two touchpads is on an opposing side of the portable card.

16. The system as in claim 11 wherein the unauthorized data sequence is an error code.

17. The system as in claim 16 wherein the card reader locks out the portable card upon receiving the error code.

18. A portable card comprising
a resonance circuit of the portable card that wirelessly receives a radio frequency signal from a security system;
a processor of the portable card that commands a transceiver to wirelessly transmits a predetermined data sequence in response to the resonance circuit receiving the radio frequency signal from the security system; and
a plurality of touch pads on the portable card, the plurality of touch pads forming first, second, and third contacts on an exterior of the portable card, wherein a user bridges at least one pair of the plurality of touch pads with one or more of the user's fingers to create a second circuit and activate the processor for transmission of the predetermined data sequence, wherein the processor of the portable card measures a first electrical value between the first contact and the second contact, a second electrical value between the second contact and the third contact, and a third electrical value between the first contact and the third contact to determine if one of the first electrical value, the second electrical value, and the third electrical value is within a predetermined range consistent with predetermined electrical values of skin, and wherein bridging the first contact and the second contact causes the transmission of an authorized data sequence and bridging the second contact and the third contact or bridging the first contact and the third contact causes the transmission of an unauthorized data sequence.

19. The portable card as in claim 18 wherein the portable card further comprises an access card and a credit card selected by a combination of the plurality of touch pads activated.

20. The portable card as in claim 1 wherein the first electrical value is a first resistance value, the second electrical value is a second resistance value, and the third electrical value is a third resistance value.

21. The system as in claim 11 wherein the card reader further comprises a door lock coupled to the card reader, and wherein the card reader activates the door lock granting access to the user into a secured area in response to receiving the authorized data sequence.

* * * * *